US 12,545,245 B2

(12) United States Patent
Srinivasan et al.

(10) Patent No.: US 12,545,245 B2
(45) Date of Patent: Feb. 10, 2026

(54) VEHICLE OPERATION AROUND OBSTACLES

(71) Applicant: Ford Global Technologies, LLC, Dearborn, MI (US)

(72) Inventors: Mohit Srinivasan, Ann Arbor, MI (US); Aditya Ganesha, Lexington, KY (US)

(73) Assignee: Ford Global Technologies, LLC, Dearborn, MI (US)

( * ) Notice: Subject to any disclaimer, the term of this patent is extended or adjusted under 35 U.S.C. 154(b) by 104 days.

(21) Appl. No.: 18/417,057

(22) Filed: Jan. 19, 2024

(65) Prior Publication Data

US 2025/0236288 A1    Jul. 24, 2025

(51) Int. Cl.
| | |
|---|---|
| *B60W 30/09* | (2012.01) |
| *B60W 10/18* | (2012.01) |
| *B60W 10/20* | (2006.01) |
| *B60W 30/095* | (2012.01) |
| *B60W 50/00* | (2006.01) |
| *B60W 60/00* | (2020.01) |

(52) U.S. Cl.
CPC ............ *B60W 30/09* (2013.01); *B60W 10/18* (2013.01); *B60W 10/20* (2013.01); *B60W 30/0953* (2013.01); *B60W 30/0956* (2013.01); *B60W 50/0097* (2013.01); *B60W 60/0015* (2020.02)

(58) Field of Classification Search
CPC combination set(s) only.
See application file for complete search history.

(56) References Cited

U.S. PATENT DOCUMENTS

| | | | |
|---|---|---|---|
| 7,124,027 B1 | 10/2006 | Ernst, Jr. et al. | |
| 10,829,128 B2* | 11/2020 | Hoshikawa | B60W 30/09 |
| 2008/0312834 A1* | 12/2008 | Noda | B60T 7/22 |
| | | | 701/301 |
| 2013/0173132 A1* | 7/2013 | Yuasa | B60W 30/0956 |
| | | | 701/70 |
| 2013/0338878 A1* | 12/2013 | Fritz | B60W 10/20 |
| | | | 701/1 |
| 2014/0032049 A1 | 1/2014 | Moshchuk et al. | |
| 2017/0057498 A1* | 3/2017 | Katoh | B60W 30/09 |

(Continued)

FOREIGN PATENT DOCUMENTS

| | | |
|---|---|---|
| KR | 102184929 B1 | 12/2020 |
| WO | 2023131095 A1 | 7/2023 |

OTHER PUBLICATIONS

Andersson, A., "Multi-Target Threat Assessment for Autonomous Emergency Braking" Department of Signals and Systems, Chalmers University of Technology, Gothenburg, Sweden, 2016, 102 pages.

*Primary Examiner* — Daniel M. Robert
(74) *Attorney, Agent, or Firm* — Frank A. Mackenzie; Brooks Kushman P.C.

(57) ABSTRACT

A computer includes a processor and a memory, and the memory stores instructions executable by the processor to determine a threat number based on sensor data indicating an obstacle, the threat number representing a risk of an impact between a vehicle and the obstacle; formulate a control barrier function based on sensor data indicating the obstacle; determine a control input based on an expression including the control barrier function and the threat number; and actuate a component of the vehicle according to the control input.

20 Claims, 4 Drawing Sheets

(56) References Cited

U.S. PATENT DOCUMENTS

| | | | |
|---|---|---|---|
| 2017/0291602 A1* | 10/2017 | Newman | B60W 10/18 |
| 2019/0004526 A1* | 1/2019 | Soliman | B62D 15/025 |
| 2019/0243371 A1* | 8/2019 | Nister | B60W 30/095 |
| 2021/0053563 A1* | 2/2021 | Li | G05D 1/0212 |
| 2021/0114591 A1* | 4/2021 | Kamiya | B60W 30/09 |
| 2024/0270238 A1* | 8/2024 | Min | B60W 30/0956 |

* cited by examiner

VEHICLE OPERATION AROUND OBSTACLES

BACKGROUND

Advanced driver assistance systems (ADAS) are electronic technologies that assist drivers in driving and parking functions. Examples of ADAS include forward proximity detection, lane-departure detection, blind-spot detection, braking actuation, adaptive cruise control, and lane-keeping assistance systems.

DETAILED DESCRIPTION

Figure 1:
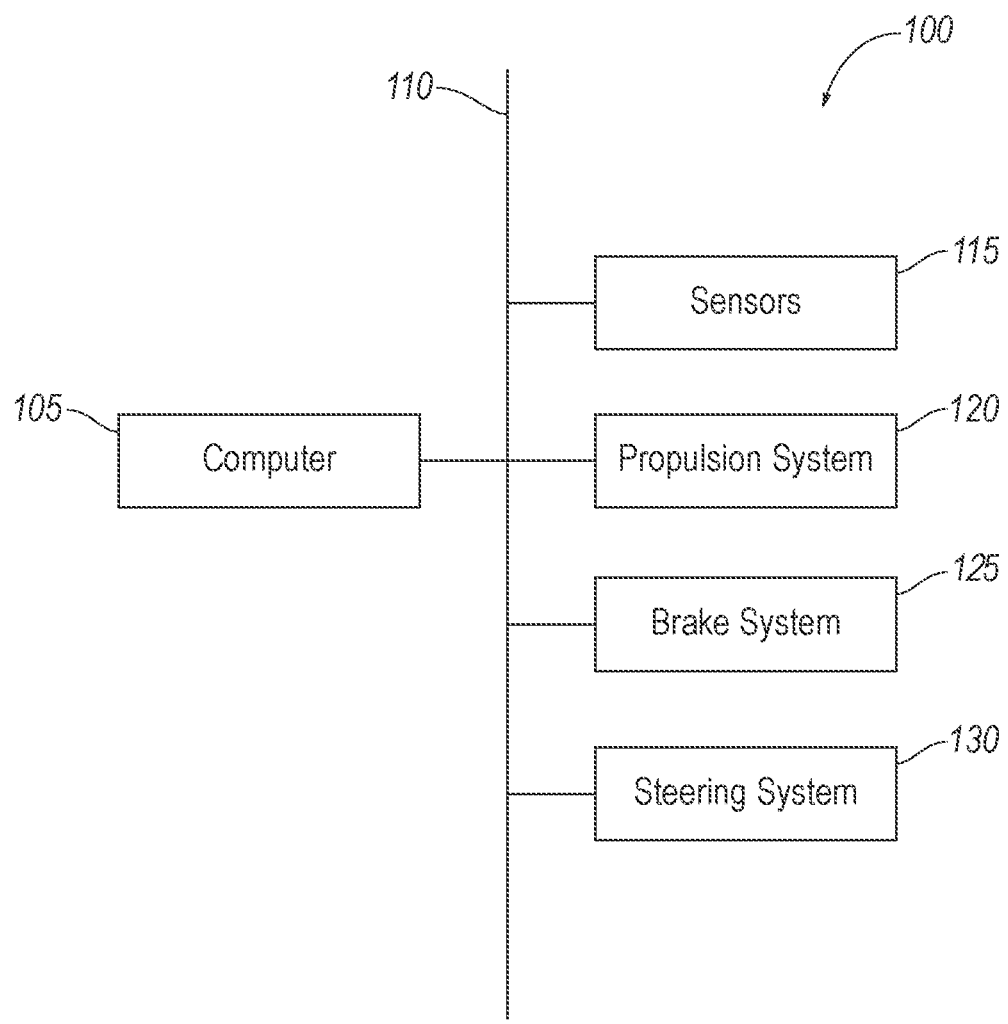
FIG. 1 is a block diagram of an example vehicle.

The techniques described herein may decrease a likelihood of contact between an obstacle and a vehicle by actuating a component of the vehicle, e.g., with autonomous operation or ADAS functions, while reducing activations in situations in which contact would not have occurred. For example, the system can actuate the vehicle, e.g., a brake system or steering system, based on a threat number for the obstacle and the proximity of the obstacle to a buffer zone surrounding the vehicle. The threat number represents a risk of an impact between the vehicle and the obstacle, e.g., an effort needed to direct the vehicle away from the obstacle relative to the effort that the vehicle is capable of. The buffer zone can be represented by a control barrier function. A computer of the vehicle is programmed to determine the threat number, formulate the control barrier function based on sensor data indicating the obstacle, determine a control input based on an expression including the control barrier function and the threat number, and actuate the component of the vehicle according to the control input. The use of the threat number can reduce actuations of the component in situations in which the obstacle is approaching closer to the vehicle, but in which the vehicle can still comfortably route away from the obstacle.

A computer includes a processor and a memory, and the memory stores instructions executable by the processor to determine a threat number based on sensor data indicating an obstacle, the threat number representing a risk of an impact between a vehicle and the obstacle; formulate a control barrier function based on sensor data indicating the obstacle; determine a control input based on an expression including the control barrier function and the threat number; and actuate a component of the vehicle according to the control input.

In an example, the instructions may further include instructions to determine the threat number based on a comparison of a first value of a kinematic quantity and a second value of the kinematic quantity, the first value being a value of the kinematic quantity to perform an operation to maneuver a vehicle away from an obstacle, the second value of the kinematic quantity being a capability of the vehicle to perform the operation. In a further example, the instructions may further include instructions to determine a predicted time for the vehicle to reach the obstacle, and determine the first value of the kinematic quantity based on the predicted time.

In another further example, the instructions may further include instructions to determine a plurality of candidate threat numbers, and select a smallest of the candidate threat numbers as the threat number.

In another further example, the operation may include at least one of braking or steering.

In an example, determining the control input may be subject to a constraint based on the control barrier function. In a further example, the constraint may be weighted by the threat number.

In another further example, the constraint may include a sum of a change with respect to time of the control barrier function and a function of the control barrier function exceeding a value. In a yet further example, the sum may be weighted by the threat number.

In an example, the control barrier function may be a difference between a distance from a reference point to the obstacle and a distance from the reference point to a point on a virtual boundary in a direction from the reference point to the obstacle. In a further example, the reference point may be inside a footprint of the vehicle.

In another further example, the reference point may be fixed relative to the vehicle.

In an example, the component of the vehicle may include at least one of a brake system or a steering system.

In an example, determining the control input may be based on minimizing a function of a difference between the control input and a nominal input. In a further example, the nominal input may be a current value of input.

In another further example, the instructions may further include instructions to receive the nominal input from an algorithm for at least partially autonomous operation of the vehicle.

A method includes determining a threat number based on sensor data indicating an obstacle, the threat number representing a risk of an impact between a vehicle and the obstacle; formulating a control barrier function based on sensor data indicating the obstacle; determining a control input based on an expression including the control barrier function and the threat number; and actuating a component of the vehicle according to the control input.

In an example, determining the control input may be subject to a constraint based on the control barrier function, and the constraint may be weighted by the threat number.

In an example, the control barrier function may be a difference between a distance from a reference point to the obstacle and a distance from the reference point to a point on a virtual boundary in a direction from the reference point to the obstacle.

In an example, the component of the vehicle may include at least one of a brake system or a steering system.

With reference to the Figures, wherein like numerals indicate like parts throughout the several views, a computer 105 includes a processor and a memory, and the memory stores instructions executable by the processor to determine a threat number based on sensor data indicating an obstacle 200, the threat number representing a risk of an impact between a vehicle 100 and the obstacle 200; formulate a control barrier function based on sensor data indicating the obstacle 200; determine a control input based on an expression including the control barrier function and the threat number; and actuate a component of the vehicle 100 according to the control input.

With reference to FIG. 1, the vehicle 100 may be any passenger or commercial automobile such as a car, a truck, a sport utility vehicle, a crossover, a van, a minivan, a taxi, a bus, etc. The vehicle 100 may include the computer 105, a communications network 110, sensors 115, a propulsion system 120, a brake system 125, and a steering system 130.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through the communications network 110. The communications network 110 may be, e.g., a controller area network (CAN) bus, Ethernet, WiFi, Local Interconnect Network (LIN), onboard diagnostics connector (OBD-II), and/or any other wired or wireless communications network. The computer 105 may be communicatively coupled to the sensors 115, the propulsion system 120, the brake system 125, the steering system 130, and other components via the communications network 110.

The sensors 115 may provide data about operation of the vehicle 100, for example, wheel speed, wheel orientation, and engine and transmission data (e.g., temperature, fuel consumption, etc.). The sensors 115 may detect the location and/or orientation of the vehicle 100. For example, the sensors 115 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 115 may detect the external world, e.g., the obstacles 200 and/or characteristics of surroundings of the vehicle 100, such as other vehicles, road lane markings, traffic lights and/or signs, road users, etc. For example, the sensors 115 may include radar sensors, ultrasonic sensors, scanning laser range finders, light detection and ranging (lidar) devices, and image processing sensors such as cameras.

The propulsion system 120 of the vehicle 100 generates energy and translates the energy into motion of the vehicle 100. The propulsion system 120 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 120 can include an electronic control unit (ECU) or the like that is in communication with and receives input from the computer 105 and/or a human operator. The human operator may control the propulsion system 120 via, e.g., an accelerator pedal and/or a gear-shift lever.

The brake system 125 is typically a conventional vehicle braking subsystem and resists the motion of the vehicle 100 to thereby slow and/or stop the vehicle 100. The brake system 125 may include friction brakes such as disc brakes, drum brakes, band brakes, etc.; regenerative brakes; any other suitable type of brakes; or a combination. The brake system 125 can include an electronic control unit (ECU) or the like that is in communication with and receives input from the computer 105 and/or a human operator. The human operator may control the brake system 125 via, e.g., a brake pedal.

The steering system 130 is typically a conventional vehicle steering subsystem and controls the turning of the wheels. The steering system 130 may be a rack-and-pinion system with electric power-assisted steering, a steer-by-wire system, as both are known, or any other suitable system. The steering system 130 can include an electronic control unit (ECU) or the like that is in communication with and receives input from the computer 105 and/or a human operator. The human operator may control the steering system 130 via, e.g., a steering wheel.

Figure 2:
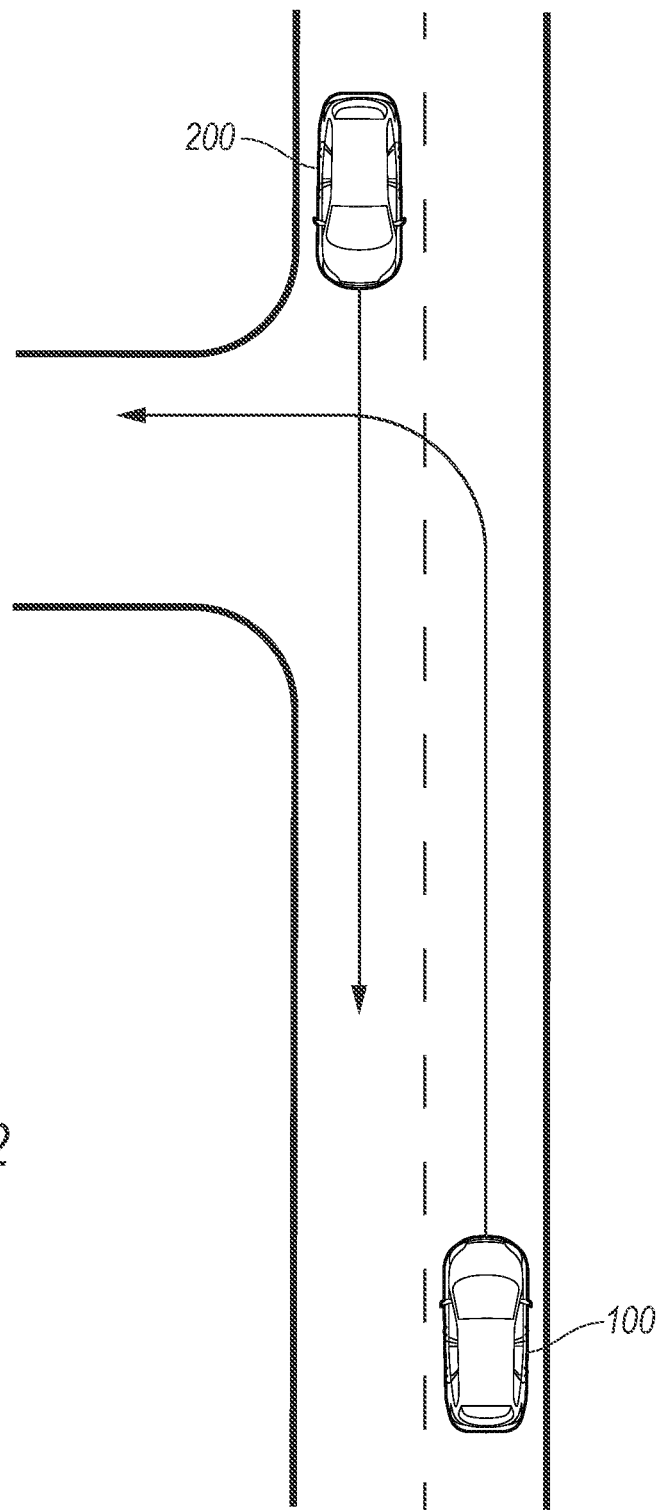
FIG. 2 is a diagrammatic top view of an example scenario of the vehicle interacting with another vehicle.

With reference to FIG. 2, the computer 105 is programmed to determine a vehicle kinematic state of the vehicle 100. For the purposes of this disclosure, a "kinematic state" is defined as a mathematical description of the position and/or motion of an entity. For example, the vehicle kinematic state can include a position, a heading, a velocity vector, and a yaw rate. The position of the vehicle 100 can be the position of a reference point 305 of the vehicle 100 (shown in FIG. 3), e.g., the center of gravity or the center of a rear axle. The components of the velocity vector of the vehicle 100 can be given by the following equations:

$$\dot{x}_H = v_H \cos \theta_H$$

$$\dot{y}_H = v_H \sin \theta_H$$

in which $(x_H, y_H)$ is the position of the vehicle 100, the dot above a variable indicates a time derivative, $v_H$ is the longitudinal velocity, i.e., speed, of the vehicle 100, and $\theta_H$ is the heading of the vehicle 100. The yaw rate of the vehicle 100 can be given by the following equation:

$$\dot{\theta}_H = \omega_H = \frac{v_H \tan \delta}{W}$$

in which $\delta$ is the steering angle of the vehicle 100 and W is the wheelbase of the vehicle 100, i.e., the longitudinal distance between a front axle and the rear axle.

The computer 105 can be programmed to determine the vehicle kinematic state based on sensor data from the sensors 115. For example, the sensors 115 can return the position from a GPS sensor, the speed $v_H$ of the vehicle 100 from wheel speed sensors, the heading $\theta_H$ of the vehicle 100 from an IMU, and the steering angle $\delta$ from the steering system 130.

The computer 105 can be programmed to actuate a component of the vehicle 100 according to an input. For the purposes of this disclosure, an "input" is one or more values that control operation of a component of the vehicle 100. For example, the component can be the brake system 125, and the input can include an intended speed $u_v$ or intended acceleration $u_a$ of the vehicle 100. Actuating the brake system 125 according to the intended speed $u_v$ of the vehicle 100 can include engaging the brake system 125 until the speed $v_H$ drops to the intended speed $u_v$. Actuating the brake system 125 according to the intended acceleration $u_a$ of the vehicle 100 can include engaging the brake system 125 so that the acceleration $a_H$ of the vehicle 100 matches the intended acceleration $u_a$ specified in the input. For another example, the component can be the steering system 130, and the input can include the intended steering angle $u_\delta$. Actuating the steering system 130 according to the intended steering angle $u_\delta$ can include turning the wheels until the steering angle $\delta$ of the wheels is oriented at the intended steering angle $u_\delta$.

The computer 105 can be programmed to receive a nominal input. The nominal input can be a current value of the input. The nominal input may include one or more values inputted by an operator. For example, if an operator is manually operating the vehicle 100, the nominal input can be the current values of the values forming the input, e.g., current values of the intended acceleration $u_a$ received from the brake pedal or accelerator pedal and/or the intended steering angle $u_\delta$ from the steering wheel. For another example, if the computer 105 is operating the vehicle 100 at least partially autonomously, the nominal input may include one or more values outputted by an algorithm for the at least partially autonomous operation of the vehicle 100. For example, the algorithm may be for full autonomous operation or for an ADAS feature. The computer 105 can receive the nominal input from the algorithm. The computer 105 may receive the nominal input from both the operator and the algorithm, e.g., the intended steering angle $u_\delta$ from the operator and the intended acceleration $u_a$ from an ADAS feature such as adaptive cruise control, or vice versa. In the absence of a control input (determined as will be described below), the computer 105 can be programmed to actuate the components of the vehicle 100 according to the nominal input.

Figure 3:
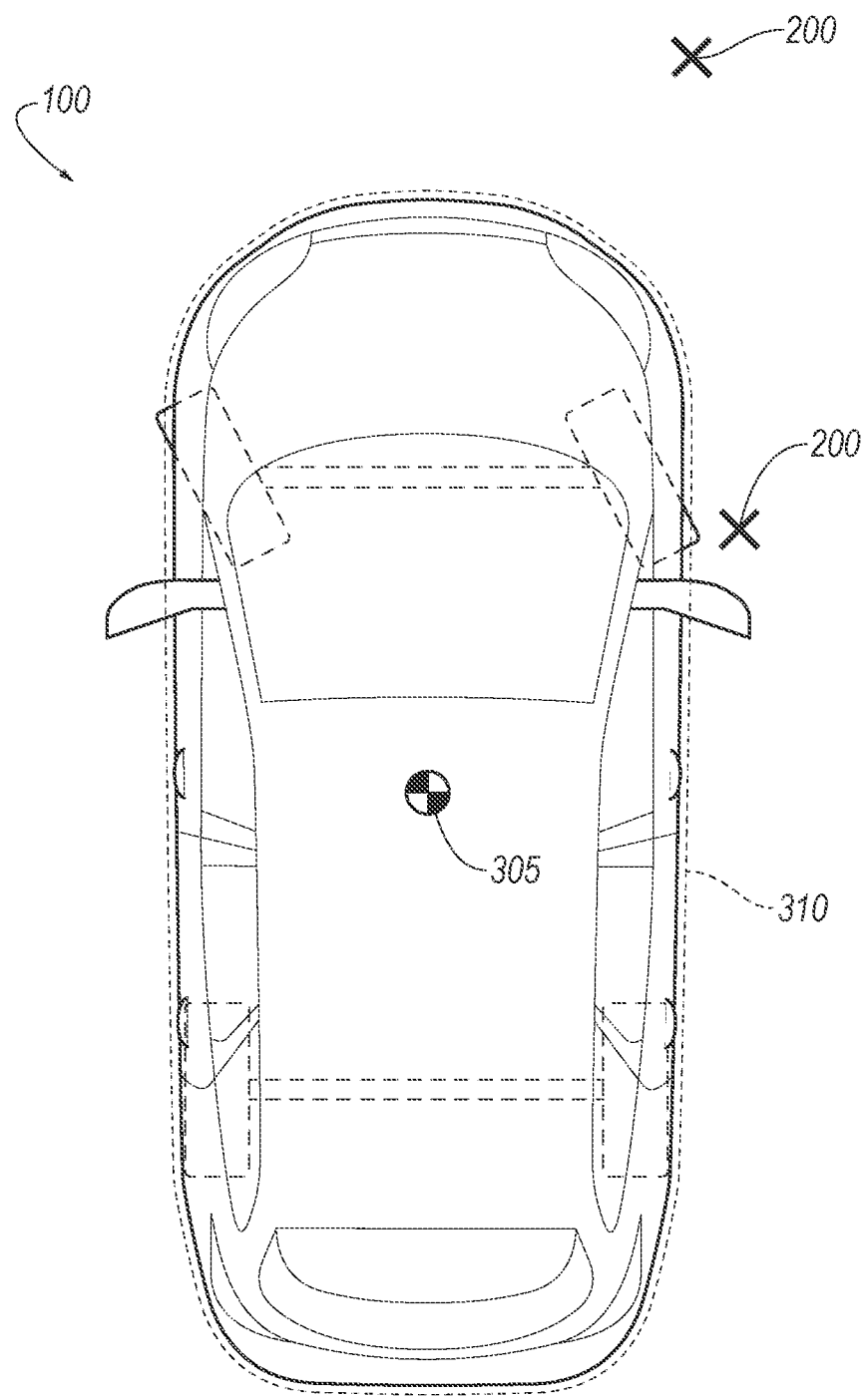
FIG. 3 is a diagrammatic top view of the vehicle with example obstacles.

The computer 105 can be programmed to receive sensor data from the sensors 115 indicating one or more obstacles 200, e.g., range data from a radar, lidar, and/or ultrasonic sensor of the sensors 115. For example, FIG. 2 shows another vehicle as an obstacle 200, and FIG. 3 shows two obstacles 200. The sensor data can include positions, headings, velocity vectors, and/or contours of the obstacles 200. The sensor data can thereby define an obstacle kinematic state. For example, the position of the obstacle 200 can be represented as a distance $r_{Hi}$ relative to the vehicle 100, e.g., from the reference point 305 of the vehicle 100 to the obstacle 200, and a direction $\theta_{Hi}$ relative to the vehicle 100, e.g., from the reference point 305 of the vehicle 100 to the obstacle 200 measured relative to a longitudinal axis of the vehicle 100, in which the subscript i is an index of the obstacles 200. The velocity vector can be represented by a speed $v_{Ti}$ of the obstacle 200 and a heading $\theta_{Ti}$ of the obstacle 200.

The computer 105 is programmed to determine at least one threat number for each obstacle 200 of a plurality of obstacles 200. A threat number represents a risk of an impact between the vehicle 100 and one of the obstacles 200. The computer 105 may determine the threat number based on the kinematic states of the vehicle 100 and of the obstacle 200. For example, the threat number may indicate a likelihood of an impact occurring in the event that the vehicle 100 and the obstacle 200 remain on their current trajectories (one of which may be stationary).

For one example of a type of threat number, the threat number may represent the ability of the vehicle 100 to perform an operation to maneuver the vehicle 100 away from the respective obstacle 200. Each threat number may be for a specific operation, e.g., braking and/or steering, and for a specific obstacle 200. The computer 105 determines each threat number based on a comparison of a first value and a second value of a kinematic quantity. The kinematic quantity is a numerical description of the position and/or motion of one or more entities. The kinematic quantity may be related to the operation of the vehicle 100, e.g., longitudinal acceleration for braking or lateral acceleration for steering. The first value is a value of the kinematic quantity to perform an operation to maneuver the vehicle 100 away from the obstacle 200, i.e., the value of the kinematic quantity available to the vehicle 100 to perform the operation to maneuver the vehicle 100 away from the obstacle 200, i.e., how much of the kinematic quantity the situation provides for the vehicle 100 to use in order to not intersect the obstacle 200. The second value is a capability of the vehicle 100 to perform the operation, i.e., a value of the kinematic quantity that the vehicle 100 would use to perform the operation, i.e., a value of the kinematic quantity that the vehicle 100 is capable of producing. The second value may be measured in the same units as the first value for the respective operation, thereby facilitating a comparison between the second value and the first value.

As a general overview, the computer 105 may be programmed to determine a plurality of candidate threat numbers for an obstacle 200, with each candidate threat number representing a different operation or manner to direct the vehicle 100 away from the obstacle 200. For each candidate threat number, the computer 105 may determine a predicted time for the vehicle 100 to reach the obstacle 200, e.g., a longitudinal time to contact (TTC), determine the first value of the kinematic quantity based on the predicted time, determine the second value, and determine the candidate threat number based on the first value and the second value, as will be described for specific examples of candidate threat numbers below. The calculations for the candidate threat numbers may be chosen so that the resulting values are between 0 and 1, with 0 representing a negligible risk of contact and 1 representing a high risk of contact, thereby making the candidate threat numbers comparable with each other. The computer 105 may then select a smallest of the candidate threat numbers as the threat number for the obstacle 200.

The computer 105 may be programmed to determine the predicted time for the vehicle 100 to reach the obstacle 200. For example, the computer 105 may determine a longitudinal TTC. The longitudinal TTC may be a time at which a longitudinal distance between the vehicle 100 and the obstacle 200 reaches zero, assuming constant longitudinal velocity by the vehicle 100 and constant velocity by the obstacle 200 along a longitudinal axis of the vehicle 100, e.g., as in the following expression:

$$TTC_{long} = \frac{D_{long}}{v_H - v_{T,long}}$$

in which $TTC_{long}$ is the longitudinal TTC, $D_{long}$ is the component of a vector between the vehicle 100 and the obstacle 200 along the longitudinal axis of the vehicle 100, and $v_{T,long}$ is the component of the velocity of the obstacle 200 along the longitudinal axis of the vehicle 100.

A first candidate threat number may be a brake threat number. The brake threat number may represent an ability of the vehicle 100 to brake to a stop before intersecting the obstacle 200. For the brake threat number, the kinematic quantity may be the deceleration of the vehicle 100, the first value of the kinematic quantity may be the deceleration so that the vehicle 100 does not intersect the obstacle 200, and the second value may be the maximum deceleration of the vehicle 100. The brake threat number may be a ratio of the first value and the second value (with a ceiling of 1), e.g., as in the following expression:

$$BTN = \min\left(\frac{decel_{need}}{decel_{max}}, 1\right)$$

in which BTN is the brake threat number, $decel_{need}$ is the first value, and $decel_{max}$ is the second value. The second value, i.e., the maximum deceleration $decel_{max}$, may be a preset value that is a physical property of the brake system 125. The computer 105 may determine the first value based on the predicted time and the velocity of the vehicle 100, e.g., as the quotient of the velocity and a difference between the predicted time and a brake-delay time, e.g., as in the following expression:

$$decel_{need} = \frac{v_H}{TTC_{long} - t_{BD}}$$

in which $t_{BD}$ is the brake-delay time. The brake-delay time may be a preset value chosen based on a typical time for an operator of a vehicle 100 to begin braking.

A second candidate threat number may be an acceleration threat number. The acceleration threat number may represent an ability of the vehicle 100 accelerate past a location that a moving obstacle 200 will occupy before the moving obstacle 200 occupies that location, e.g., to accelerate past a projected path of another vehicle before the other vehicle reaches the path of the vehicle 100. For the acceleration threat number, the kinematic quantity may be the longitudinal acceleration of the vehicle 100, the first value of the kinematic quantity may be a longitudinal acceleration to clear a path of the obstacle 200, and the second value of the kinematic quantity may be a maximum longitudinal acceleration of the vehicle 100. The acceleration threat number may be a ratio of the first value and the second value. The first value, i.e., the acceleration needed to clear the path of the obstacle 200, may be twice the forward distance to clear the path divided by the square of the time to contact, e.g., as in the following expression for the acceleration threat number:

$$ATN = \frac{2*\max(0, \Delta d)/TCC_{long}^2}{a_{max}}$$

in which ATN is the acceleration threat number, $\Delta d$ is the distance to clear the path of the obstacle 200, and $a_{max}$ is maximum acceleration of the vehicle 100. The distance $\Delta d$ may be a sum of a distance from the vehicle 100 to a far side of the path of the obstacle 200 and the length of the vehicle 100, both along the longitudinal axis of the vehicle 100. The second value, i.e., the maximum acceleration $a_{max}$, may be a preset value that is a physical property of the propulsion system 120.

A third candidate threat number may be a steering threat number. The steering threat number may represent an ability of the vehicle 100 to turn away from intersecting the obstacle 200. For the steering threat number, the kinematic quantity may be the lateral acceleration of the vehicle 100, the first value of the kinematic quantity may be a lateral acceleration to clear the obstacle 200, and the second value of the kinematic quantity may be a maximum lateral acceleration of the vehicle 100. The steering threat number may be a ratio of the first value and the second value (with a ceiling of 1), e.g., as in the following expression:

$$STN = \min\left(\frac{a_{lat,need}}{a_{lat,max}}, 1\right)$$

in which STN is the steering threat number, $a_{lat,need}$ is the first value, and $a_{lat,max}$ is the second value. The second value, i.e., the maximum lateral acceleration $a_{lat,max}$, may be a preset value that is a physical property of the steering system 130. The first value, i.e., the lateral acceleration $a_{lat,need}$ needed to clear the obstacle 200, may be twice the lateral distance to clear the obstacle 200 divided by the square of the time to contact, e.g., as in the following expression:

$$a_{lat,need} = \frac{2*\max(\Delta d_{lat}, 0)}{TCC_{long}^2}$$

in which $\Delta d_{lat}$ is lateral distance to clear the obstacle 200. The lateral distance $\Delta d_{lat}$ may be a difference between a preset lateral margin for clearing the obstacle 200 and a predicted lateral offset between the vehicle 100 and the obstacle 200 when the vehicle 100 reaches the obstacle 200, assuming constant lateral acceleration.

The computer 105 may be programmed to select a smallest of the candidate threat numbers for an obstacle 200 as the threat number for the obstacle 200. Each threat number may represent a different operation or manner to direct the vehicle 100 away from the obstacle 200, so the smallest candidate threat number represents the overall ability to direct the vehicle 100 away from the obstacle 200. For the example candidate threat numbers above, the computer 105 may select a smallest value from the brake threat number, the acceleration threat number, and the steering threat number, as in the following expression:

$$TN_i = \min(BTN_i, ATN_i, STN_i)$$

in which the subscript i is an index for the obstacles 200 and TN is the threat number. The computer 105 may determine the candidate threat numbers and select the smallest as the threat numbers for each of multiple obstacles 200, i.e., for different values of i.

For another example of a type of threat number, the computer 105 may be programmed to execute a machine-learning model trained to output a metric indicating a risk of an impact between the vehicle 100 and the obstacle 200. The machine-learning model may take the vehicle kinematic state and the obstacle kinematic state as inputs. The machine-learning model may output a probability value, which may be a scalar value between 0 and 1. The machine-learning model may be trained using reinforcement learning. The training data may be a plurality of scenarios, with each scenario including vehicle kinematic states and obstacle kinematic states over a common timeline, paired with flag indicating whether or not an impact occurs in the scenario. The training data may be generated through vehicle simulations, actual vehicle operation, or both. The vehicles in the scenarios may be human-controlled, whether simulated or actual. The machine-learning model may thus account for the capability of the vehicle 100 to perform an operation to maneuver the vehicle 100 away from the obstacle 200, as does the first type of threat number described above.

With reference to FIG. 3, the computer 105 may be programmed to formulate a control barrier function $h_i$ for each obstacle 200 with respect to the vehicle 100 based on the sensor data indicating the obstacle 200. Each control barrier function $h_i$ may be a difference between the distance $r_{Hi}$ from the reference point 305 of the vehicle 100 to the respective obstacle 200 and a point on a virtual boundary 310 in the direction $\theta_{Hi}$ from the reference point 305 of the vehicle 100 to the obstacle 200. The virtual boundary 310 can be represented as a function $\Gamma_H$ of the direction $\theta_{Hi}$ that returns a distance from the reference point 305 of the vehicle 100 in the direction $\theta_{Hi}$ to the virtual boundary 310. Each control barrier function $h_i$ can be a function of the vehicle kinematic state and the respective obstacle kinematic state. For example, the control barrier function $h_i$ can be represented by the following equation:

$$h_i(r_H, \theta_H, \theta_{Hi}, \theta_{Ti}, v_H, v_{Ti}) = r_{Hi} - \Gamma_H(\theta_{Hi})$$

The virtual boundary 310 may extend around a footprint of the vehicle 100. For example, the virtual boundary 310 may follow an outer edge of the footprint of a body of the vehicle 100, or the virtual boundary 310 may be spaced by a buffer distance from the footprint of the vehicle 100 outside the footprint of the vehicle 100. The reference point 305 may be inside the footprint of the vehicle 100, such that a direction from the reference point 305 to an obstacle 200 passes through the virtual boundary 310. The reference point 305 is fixed relative to the vehicle 100, meaning that the virtual boundary 310 is also fixed.

The control barrier functions $h_i$ provides a computationally efficient manner for the computer 105 to determine the control input, described below. For example, the computer 105 can determine constraints based on the control barrier function and solve an optimization problem subject to the constraints using a quadratic program, as will be described in turn. Quadratic programming is an efficient technique for solving the optimization problem, and the use of the control barrier function permits formulation of the optimization problem in the manner required for quadratic programming.

Determining the control input (described below) can be subject to a first constraint based on the control barrier function $h_i$. To explain the first constraint, reference is first made to an underlying constraint. The underlying constraint may be that a sum of a time derivative of the control barrier function $h_i$ and a function $\alpha(\cdot)$ of the control barrier function $h_i$ exceeds a first value. The first value can be zero. For example, the underlying constraint can be represented by the following expression:

$$\dot{h}_H + \alpha(h_H) \geq 0$$

The function $\alpha(\cdot)$ can be locally Lipschitz continuous, i.e., within a range of the function $\alpha(\cdot)$ that is implicated by the first constraint or underlying constraint, the absolute value of the slope between any two points is not greater than a predefined real number. In other words, there is a maximum rate of change of the function a with respect to the control barrier function $h_i$. The function $\alpha(\cdot)$ can be a class $\kappa$ function, i.e., is strictly increasing and is equal to zero when the argument is zero, i.e., $\alpha(0)=0$. The function $\alpha(\cdot)$ can be chosen to cause the component of the vehicle 100 to actuate in time to prevent the vehicle 100 from contacting the obstacle 200. For example, the function $\alpha(h_i)$ can be a product of a parameter $\lambda$ and the control barrier function $h_i$, i.e., $\alpha(h_i)=\lambda h_i$. The parameter $\lambda$ can be chosen to control the sensitivity of the underlying constraint. An equivalent form for the underlying constraint for the ith obstacle 200 is the following expression:

$$-L_{gh}h_i u \leq L_{fh}h_i + \alpha(h_i)$$

in which u is the control input and $L_{gh}$ and $L_{fh}$ are the Lie derivatives of the components of $h_i$, treating $h_i$ as a standard control affine system. Like the first expression for the underlying constraint, this expression includes a sum of a change with respect to time of the control barrier function ($L_{fh}h_i$) and a function of the control barrier function ($\alpha(h_i)$) exceeding a value ($-L_{gh}h_i u$).

The first constraint is an expression including the control barrier function and the threat number. Specifically, the first constraint is the underlying constraint weighted by the threat number, e.g., the second expression for the underlying constraint above with the sum of the change with respect to time of the control barrier function and the function of the control barrier function weighted by the threat number, as in the following expression:

$$L_{gh}h_i u \geq -TN_i(L_{fh}h_i + \alpha(h_i))$$

When the threat number is closer to zero, the first constraint is in effect less constraining, i.e., less likely to change the control input away from the nominal input, and when the threat number is closer to one, the first constraint is in effect more constraining, i.e., more likely to change the control input away from the nominal input.

Determining the control input (described below) can be subject to a second constraint. The second constraint can be that the control input is below a maximum value, e.g., as represented by the following equation:

$$|u| \leq u_{max}$$

in which u is the control input and $u_{max}$ is the maximum value. The maximum value $u_{max}$ can be chosen based on the capabilities of the component of the vehicle 100 that is controlled by the input, e.g., the brake system 125 and/or the steering system 130.

The computer 105 is programmed to determine the control input u based on the first constraint, i.e., the expression including the control barrier function $h_i$ and the threat number. For example, determining the control input u can include minimizing a function of a difference between the control input u and the nominal input $u_{nom}$. For example, determining the control input u can include solving a quadratic program subject to the first and second constraints. Quadratic programming means solving optimization problems formulated as quadratic functions. For example, solving the quadratic program can include minimizing a square of the difference between the control input u and the nominal input $u_{nom}$ subject to the first and second constraints above, e.g., as represented by the following formula:

$$\min_{u \in \mathbb{R}^m} \|u - u_{nom}\|_2^2$$

in which $\mathbb{R}^m$ is the set of m-length vectors of real numbers. For example, if the control input u includes the acceleration $u_a$ of the vehicle 100 and the steering angle $u_s$, then the length m of the vector of the control input u is 2.

In the event of multiple obstacles 200, the computer 105 can be programmed to determine the control input u based on the first constraint for all or a subset of the obstacles 200. For example, if three obstacles 200 are present, determining the control input u can include solving a quadratic program as described above subject to three first constraints (one for each obstacle 200) and the second constraint.

The computer 105 can be programmed to actuate the component of the vehicle 100, e.g., the brake system 125 and/or steering system 130, according to the control input u. For example, the computer 105 can be programmed to actuate the component according to the control input u in response to the computer 105 determining the control input u and to actuate the component according to the nominal input $u_{nom}$ otherwise.

Figure 4:
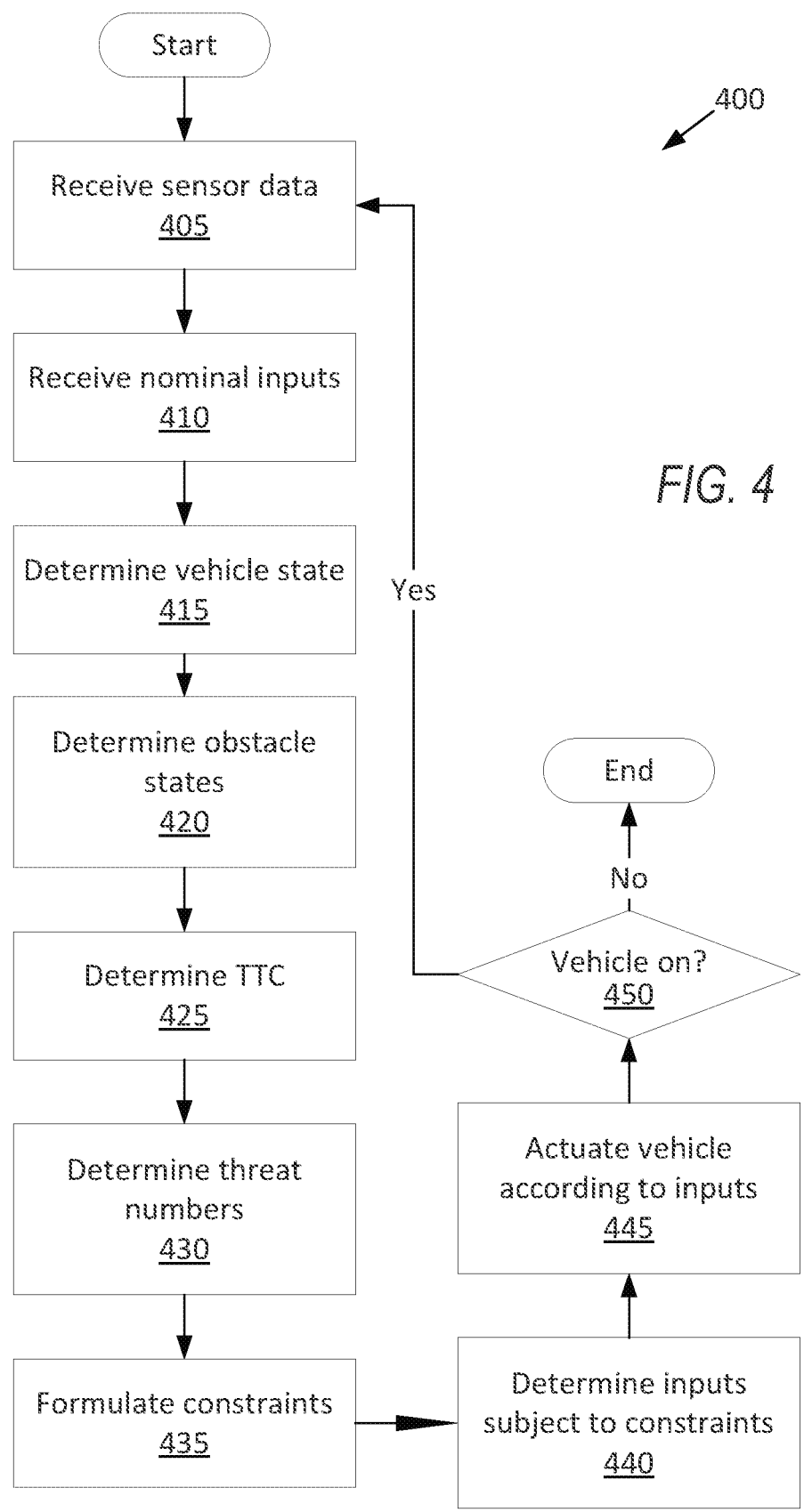
FIG. 4 is a flowchart of an example process for controlling the vehicle.

FIG. 4 is a flowchart illustrating an example process 400 for controlling the vehicle 100. The memory of the computer 105 stores executable instructions for performing the steps of the process 400 and/or programming can be implemented in structures such as mentioned above. As a general overview of the process 400, the computer 105 receives data from the sensors 115, receives the nominal input $u_{nom}$, determines the vehicle kinematic state, determines the obstacle kinematic states, determines the times to contact for the obstacles 200, determines the threat numbers for the obstacles 200, formulates the first and second constraints, solves the quadratic program for the control input u subject to the constraints, and actuates the component of the vehicle 100 according to the control input u. The process 400 can continue for as long as the vehicle 100 remains on; i.e., the computer 105 repeatedly performs these steps while the vehicle 100 remains on.

The process 400 begins in a block 405, in which the computer 105 receives the sensor data from the sensors 115 indicating the obstacles 200, as described above.

Next, in a block 410, the computer 105 receives the nominal input $u_{nom}$, as described above.

Next, in a block 415, the computer 105 determines the vehicle kinematic state, as described above.

Next, in a block 420, the computer 105 determines the obstacle kinematic states for the obstacles 200, as described above.

Next, in a block 425, the computer 105 determines the predicted times to reach the respective obstacles 200, as described above.

Next, in a block 430, the computer 105 determines the threat numbers for the respective obstacles 200, as described above.

Next, in a block 435, for each obstacle 200, the computer 105 formulates the respective control barrier function $h_i$ and determines the respective first constraint based on the respective control barrier function and the respective threat number, as described above.

Next, in a block 440, the computer 105 determines the control input u based on the expression including the control barrier function $h_i$ and the threat number, e.g., solving for the optimal control input u subject to the first constraints for the obstacles 200 and subject to the second constraint, as described above.

Next, in a block 445, the computer 105 actuates the component of the vehicle 100, e.g., the brake system 125 and/or the steering system 130, according to the control input u, as described above.

Next, in a decision block 450, the computer 105 determines whether the vehicle 100 is still on. If so, the process 400 returns to the block 405 to continue receiving the sensor data. If not, the process 400 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. Use of "in response to," "upon determining," etc. indicates a causal relationship, not merely a temporal relationship. The adjectives "first," "second," and "third" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   determine a threat number based on sensor data indicating an obstacle, the threat number representing a risk of an impact between a vehicle and the obstacle;
   formulate a control barrier function based on sensor data indicating the obstacle;
   determine a control input based on an expression including the control barrier function and the threat number, wherein determining the control input is subject to a constraint based on the control barrier function, and the constraint includes a sum of a change with respect to time of the control barrier function and a function of the control barrier function exceeding a value; and
   actuate a component of the vehicle according to the control input.

2. The computer of claim 1, wherein the instructions further include instructions to determine the threat number based on a comparison of a first value of a kinematic quantity and a second value of the kinematic quantity, the first value being a value of the kinematic quantity to perform an operation to maneuver the vehicle away from an obstacle, the second value of the kinematic quantity being a capability of the vehicle to perform the operation.

3. The computer of claim 2, wherein the instructions further include instructions to determine a predicted time for the vehicle to reach the obstacle, and determine the first value of the kinematic quantity based on the predicted time.

4. The computer of claim 2, wherein the instructions further include instructions to determine a plurality of candidate threat numbers, and select a smallest of the candidate threat numbers as the threat number.

5. The computer of claim 2, wherein the operation includes at least one of braking or steering.

6. The computer of claim 1, wherein the constraint is weighted by the threat number.

7. The computer of claim 1, wherein the sum is weighted by the threat number.

8. The computer of claim 1, wherein the control barrier function is a difference between a distance from a reference point to the obstacle and a distance from the reference point to a point on a virtual boundary in a direction from the reference point to the obstacle.

9. The computer of claim 8, wherein the reference point is inside a footprint of the vehicle.

10. The computer of claim 8, wherein the reference point is fixed relative to the vehicle.

11. The computer of claim 1, wherein the component of the vehicle includes at least one of a brake system or a steering system.

12. The computer of claim 1, wherein determining the control input is based on minimizing a second function of a difference between the control input and a nominal input.

13. The computer of claim 12, wherein the nominal input is a current value of input.

14. The computer of claim 12, wherein the instructions further include instructions to receive the nominal input from an algorithm for at least partially autonomous operation of the vehicle.

15. A method comprising:
   determining a threat number based on sensor data indicating an obstacle, the threat number representing a risk of an impact between a vehicle and the obstacle;
   formulating a control barrier function based on sensor data indicating the obstacle;
   determining a control input based on an expression including the control barrier function and the threat number, wherein determining the control input is subject to a constraint based on the control barrier function, and the constraint includes a sum of a change with respect to time of the control barrier function and a function of the control barrier function exceeding a value; and
   actuating a component of the vehicle according to the control input.

16. The method of claim 15, wherein the constraint is weighted by the threat number.

17. The method of claim 15, wherein the control barrier function is a difference between a distance from a reference point to the obstacle and a distance from the reference point to a point on a virtual boundary in a direction from the reference point to the obstacle.

18. The method of claim 15, wherein the component of the vehicle includes at least one of a brake system or a steering system.

19. The method of claim 15, wherein the sum is weighted by the threat number.

20. The method of claim 15, wherein the control barrier function is a difference between a distance from a reference point to the obstacle and a distance from the reference point to a point on a virtual boundary in a direction from the reference point to the obstacle.

* * * * *